United States Patent
Drygala

(10) Patent No.: US 12,069,975 B2
(45) Date of Patent: Aug. 27, 2024

(54) METHODS FOR PROTECTING SOD DURING HARVEST AND TRANSPORT, INCREASING SOD SHELF-LIFE, AND IMPROVING RE-ESTABLISHMENT UPON REPLANTING

(71) Applicant: HollyFrontier LSP Brand Strategies LLC, Dallas, TX (US)

(72) Inventor: Reinie Drygala, Dallas, TX (US)

(*) Notice: Subject to any disclaimer, the term of this patent is extended or adjusted under 35 U.S.C. 154(b) by 213 days.

(21) Appl. No.: 17/473,236

(22) Filed: Sep. 13, 2021

(65) Prior Publication Data
US 2022/0078980 A1   Mar. 17, 2022

Related U.S. Application Data

(60) Provisional application No. 63/077,145, filed on Sep. 11, 2020.

(51) Int. Cl.
*A01B 79/00* (2006.01)
*C09K 17/18* (2006.01)
*A01N 27/00* (2006.01)

(52) U.S. Cl.
CPC ............... *A01B 79/00* (2013.01); *C09K 17/18* (2013.01); *A01N 27/00* (2013.01)

(58) Field of Classification Search
CPC .............................. A01B 79/00; C09K 17/18
See application file for complete search history.

*Primary Examiner* — Svetlana M Ivanova
(74) *Attorney, Agent, or Firm* — Jackson Walker LLP

(57) ABSTRACT

An improved mineral oil is useful in protecting sod during the harvesting, transporting, and reestablishment of the sod. The improved mineral oil mimics the cuticular wax of the sod plant. It is applied to a plot of sod one (1) or more times before harvesting the sod so that the improved mineral oil is generally aborbed by the sod plants. A solution including the improved mineral oil and copper pigment in water with an emulsifier may be used. Methods for protecting sod during the harvesting, transporting, and reestablishment of the sod using of the improved mineral oil are described.

39 Claims, 8 Drawing Sheets

| Class of acyl lipid cuticular wax | Generic structure |
|---|---|
| Fatty acid | ~~~~~~~~~~COOH |
| Aldehyde | ~~~~~~~~~~CHO |
| Primary alcohol | ~~~~~~~~~~OH |
| Secondary alcohol | ~~~~~~~OH~~~~~~ |
| Alkane | ~~~~~~~~~~~~ |
| Ketone | ~~~~~~O~~~~~~ |
| Wax ester | ~~~~~~COO~~~~~~~~ |

FIG. 4

METHODS FOR PROTECTING SOD DURING HARVEST AND TRANSPORT, INCREASING SOD SHELF-LIFE, AND IMPROVING RE-ESTABLISHMENT UPON REPLANTING

This application is based upon and claims priority from U.S. Provisional application Ser. No. 63/077,145, filed on Sep. 11, 2020, which is incorporated herein by reference.

BACKGROUND OF THE INVENTION

Field of the Invention

Applicants' invention relates to a method for increasing the shelf-life after sod is cut and during storage and transport, and improving re-establishment of the sod after replanting. More particularly, it relates to a method for applying an improved mineral oil that mimics the cuticular wax of the sod plant prior to cutting.

Background Information

Sod (sometimes also referred to as turf or turf grass) is a mature grass cover, which is produced, in an intensively managed agricultural operation. Conventional sod is a layer of grass with a layer of soil in which the grass roots are established. The root system helps hold the sod together, in some helped by biodegradable materials. Sod is desirable because it provides an almost instant lawn over an area or in spots. It is most commonly used for lawns for private homes, businesses, and schools, for golf courses and for sports fields. Sod provides increased speed and ease of establishing a lawn as opposed to seeding grass in the desired area.

Sod has been used for many applications and provides many benefits and is the prevalent landscape material/coverings used and recommended for both residential and commercial use. Sod is used to establish a lawn quickly especially in areas where seed would be too expensive to use or would simply blow away. It can be used on hillsides and new construction sites in order to help prevent erosion. Sod can improve cooling and can improve air and water quality in the immediate area. Sod is effective in improving cooling by reducing air temperatures through natural, transpirational cooling. Sod can help improve water quality through filtering of precipitation, irrigation or effluent water. It can also assist in flood prevention by providing drainage water basins, and by helping to drain water by diverting it into the ground where it becomes part of the ground water supply.

Sod also provides a relatively quick way to establish erosion control and protect land from wind and water damage. It absorbs pollutants such as carbon dioxide from the air and traps dust and dirt from the atmosphere. Sod can decrease weeds in lawns, which helps with control pollen-reducing allergic reactions. Sod provides an almost instant uniform lawn which can increase property value by providing attractive green space. And, traditionally (although not so commonly anymore), sod has been used as a roofing and siding material for homes and structures.

Conventionally, sod is planted and then harvested sometime between 10 and 18 months later depending on the variety and how quickly it grows to the right size for harvest. As with any plant, climate and soil conditions at the sod location, as well as other factors such as the use of fertilizer, affect the rate of growth. There are many different types of sod because different types of grass grow better under different conditions, or are more desirable to the user. Many have been specifically bred to handle conditions in an area, and some are just very adaptable to wherever they will grow.

Sod quality is usually reckoned based upon: uniformity, good density, freedom from serious weeds/insects/disease, acceptable color, adequate sod strength, sufficient maturity in terms of carbohydrate reserves, and minimal amount of thatch. Poor sod density must be cut thicker to facilitate handling and to compensate for lack of sufficient root development. Poor sod results in more weight being transported—higher costs.

Sod is harvested and sold as square slabs (often easier to handle for a private homeowner), rolled rectangles (typically used for new lawn installations), or in four foot wide rolls for major repair projects (typically in bigger, commercial installations). During harvest, an extreme stress, sod is cut which cuts roots (root pruning)—the main avenue to absorbing required moisture as well as nutrients. This mechanical stress (i.e. harvesting) impacts the ability of the sod to reestablish itself upon planting/being laid on ground which could lead to sod not rooting or establishing itself resulting in death.

In order to minimize transportation costs and damage to the sod itself, sod is usually grown relatively near to its intended market. When harvested in preparation for sale, sod is usually rolled or stacked. This can be damaging to the grass plants if left in the stacks or rolls due to lack of light, lack of water, and physical stresses. Due to these issues, the shelf life of sod is relatively short post-harvest. In hot weather, sod generally must be laid within 12 hours before the sod is killed by heat. Because of vulnerability to heat, most sod producers are within 50-100 miles of their market, particularly in southern regions. Helminthosporium is a phyto pathogenic fungi of turf grass that can cause crown rot and leafspot diseases. Leafspot increases sod heating and additional diseases, each of which can reduce the shelf life of the sod. Therefore, users generally try to use harvested sod as soon as possible to maximize the sod's viability after installing it (may also be referred to as laying, laid in, planting, establishment, or re-establishment).

Upon installation, sod needs care in the same manner as any grass, but it is more susceptible to issues until it becomes established. When sod is harvested, a large percentage of the root system is cut away so the sod has a much reduced ability to absorb water. This affects the establishment depending upon when the sod is laid in. For example, in warm or hot months, it is necessary to water more often in order to keep the new grass from getting drought stressed. Conversely, if the sod is laid during cool or cold months, the sod does not dry out nearly as fast and it is important to limit the watering frequency to avoid disease activity, such as fungus. A user may apply fungicides as needed. Mineral oils can be used to control a wide variety of insect pests and suppress the spread of both viral and fungal diseases. Fungal diseases like powdery mildew and sooty mold can be controlled with horticultural oils by controlling the vector insects, and by trapping fungal spores which helps prevent continued spread of the disease.

Mineral oils are conventionally applied to non-dormant, healthy turf, preventatively, prior to the onset of disease symptoms. The mineral oil works to prevent diseases from taking hold in the first place and can also provide some treatment benefits.

Mineral oil is a type of hydrocarbon. As used herein, "hydrocarbon" refers to various liquid forms of organic compounds that consist of hydrogen and carbon. Common hydrocarbons include, but are not limited to, petroleum based fuels, solvents, and lubricants. Hydrocarbons are divided into two classes: aromatic compounds and aliphatic compounds (also known as non-aromatic hydrocarbons).

Open-chain hydrocarbon compounds (whether straight or branched) contain no rings of any type, and are thus aliphatic. Aliphatics can be cyclic as well. Aliphatic compounds can be saturated, like hexane, or unsaturated, like hexene and hexyne.

A saturated compound is a chemical compound (or ion) that resists the addition reactions, such as hydrogenation, oxidative addition, and binding of a Lewis base (such as OH⁻). Overall, saturated compounds are less reactive than unsaturated compounds.

An aromatic compound may be a cyclic (ring-shaped) or planar (flat) structure, and has a ring of resonance bonds that gives increased stability compared to other geometric or connective arrangements with the same set of atoms. Aromatic molecules are very stable, and do not break apart easily to react with other substances.

SUMMARY OF THE INVENTION

The present invention involves the use of an improved mineral oil for use on sod that is expected to be harvested, in the near term, allowing grass sod to increase hardiness and longevity when rolled or stacked. Various aspects and characteristics of the improved mineral oil are described herein.

Transpiration is the loss of water (in vapor form) from plants. It is a physical process wherein water travels from the soil into the roots of plants, and up to the underside of plant leaves, where it is released into the air. Transpiration is driven by the sun and is affected by both physiological and external physical factors. The exchange of oxygen and carbon dioxide in the leaf, as well as transpiration, occurs through pores called stomata. Stomata generally open during the day (when light is striking them) and close at night (when there is less light). After cutting, the way that sod is stacked on pallets limits the regular transpiration that occurs in the plant because, in part, there is less light on the sod leaf blades so the stomata tend to close and the sod plants are tightly packed and not as exposed to the air. As a result, the sod's transpiration of carbon dioxide and oxygen is reduced—in essence, the sod plants can't breathe, or at least the "breathing rate" is reduced. Using the enhanced mineral oil and the method of the current invention, lowers the amount of respiration of the sod plants prior to cutting at approximately the rate of 2-4%. By reducing the rate of respiration, the plant can reduce its consumption of energy. Reducing transpiration in this manner prepares the sod plants for cutting, storage, and transport, while reducing the negative impact on the plant itself. This efficiency in energy consumption is hypothesized to be a benefit during the transport of the sod, for example from the sod farm to the consumer. This effect of reduced respiration, allows the plant to better withstand the issues resulting from stacking/rolling of sod on pallets after harvest.

In addition, the method allows not only improved transport/shelf life it also leads to improved re-establishment of the sod once it has been laid/planted. Nutrient (i.e. fertilizers) uptake efficiency is a description of how well the sod utilizes nutrients, and minimizing of the sod not losing the nutrients (e.g. for Nitrogen) to volatility. A larger percentage of Nitrogen, Phosphorus, and Potassium remains in the leaf tissue during the storage/transport period when the current method is employed. Improved nutrient uptake efficiency allows for the newly laid sod to establish quicker despite having been exposed to a longer storage/transport period. The method improves nutrient uptake efficiency.

In general, mineral oils can include aliphatic solvents, dormant oils, foliage oils, foliar oils, horticultural oils, insecticidal oils, narrow-range oils, neutral oils, paraffinic oils, alkane, petroleum-derived spray oils, petroleum distilled spray oils ("PDSO"), petroleum spray oils ("PSO"), refined petroleum distillates, spray oils, and summer oils.

The improved mineral oil consists of molecules wherein the aromatics have been substantially removed—it is greater than 95% mineral oil and ideally greater than 99% mineral oil. Stated differently, the improved mineral oil has had 95% or more of the aromatics removed, and ideally 99% or more of the aromatics removed. Or, the improved mineral oil contains 5% or less of aromatic molecules, and ideally the improved mineral oil contains 1% or less of aromatic molecules. The carbon chain lengths of the improved mineral oil range from approximately 17 to 32 carbon molecules. The improved mineral oil contains greater than 80% carbon by weight. e.g. A gallon would have at least 6 pounds of carbon.

The method of the current invention is intended to mimic the plant cuticle. A plant cuticle covers the epidermis of plants and acts as a protecting film over the leaves, young shoots and other aerial plant organs. It is made from an extracellular hydrophobic layer that covers the aerial epidermis of all land plants, providing protection against desiccation and external environmental stresses. The plant cuticle consists of lipid and hydrocarbon polymers impregnated with wax, and is synthesized exclusively by the epidermal cells. Its two major components are polymer cutin and cuticular waxes. The cuticular membrane is insoluble because of the soluble waxes with which it is impregnated and covered.

The cutin is composed of a covalently linked macromolecular scaffold, while the waxes are a variety of organic solvent-soluble lipids. Plant cuticular waxes are mixtures of hydrophobic aliphatic compounds. Cuticular wax is largely composed of compounds which derive from very-long-chain fatty acids ("VLCFA")—hydrocarbons with chain lengths typically in the range of C16 to C36, such as aldehydes, primary alcohol, secondary alcohol, alkanes, ketones, and esters. However, cuticular wax may also have other, non-VLCFA derivative compounds present, such as terpenoids, flavonoids, and sterols.

The improved mineral oil has a similar molecular structure to the natural alkane found in the plant cuticle. The cuticle chemistry alkane is generally a linear, although it may be branched or be a cyclic-substituted alkane (napthene).

The method of use of the present invention involves the preparation of sod prior to cutting or harvesting and packing for shipping. The preparation helps the sod better resist the stresses associated with shipping the sod. Thus applying the improved mineral oil to a plot of pre-harvested sod using an amount of the improved mineral oil and with enough time before harvesting so that the improved mineral oil is allowed to be generally absorbed by the sod will improve the ability of the sod to re-establish after it is harvested, transported and replanted.

In a first example embodiment of the present invention, the improved mineral oil is applied on day 1 followed by a second application 14 days after initiation. The application is applied at the approximate volume of 8.5 fl. oz. of improved mineral oil per 1,000 ft² sod plot size. The improved mineral oil can be mixed into a carrier solution 1-2 gallons of water with an emulsifier. Twenty one days after initiation, the turf grass is cut using a sod cutter and stacked (if cut in larger pieces, they may be rolled). Sod pieces may be cut to approximately 12×36 inches. A second piece of sod is placed on top of the first piece for stacking on a pallet, with additional pieces added. The sod pieces are transported to the planting site, and planted. Cut sod may be stored in full sun with no supplemental water applied. After the sod is planted, sod should be managed according to best management practices. This method could, for example, be conducted on Latitude Bermudagrass beginning in July and Kentucky Bluegrass beginning in September when the sod grass is active and growing.

In a second example embodiment, the same method is used as in the first example embodiment, but additional applications of the improved mineral oil is made to the soil in increments of approximately 14 days before initiation.

As stated above, in preparation for sale, sod is cut and then usually rolled or stacked, all of which stress the grass plants due to lack of light, lack of water, and physical stresses. Conventionally, users try to install sod as soon as possible in order to maximize the sod's viability. The method of the present invention can both lengthen the time sod can be stored or spent in transport, and increase the favorable characteristics and viability of the sod immediately upon and in the near future after installation/planting.

BRIEF DESCRIPTION OF THE DRAWINGS

FIG. 4 illustrates schematics of the molecular structures of several alkanes found in the plant cuticle.

DETAILED DESCRIPTION OF THE PREFERRED EMBODIMENT

Figure 1:
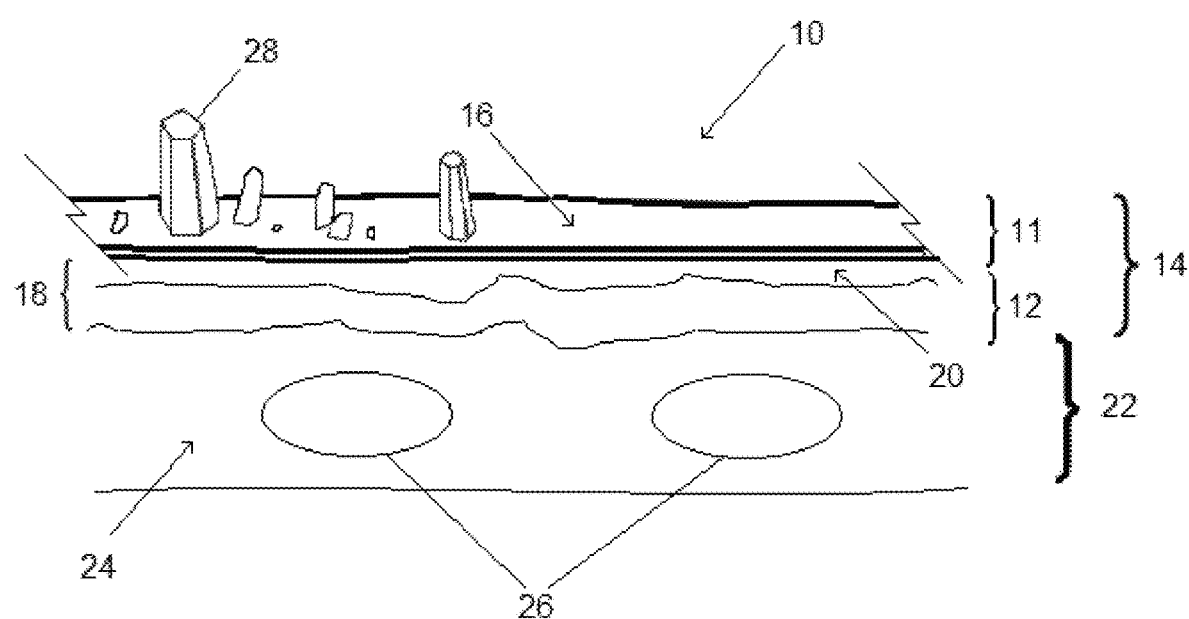
FIG. 1 is a diagram illustrating the cuticle layer of sod cells.

Referring to the figures, FIG. 1 illustrates the cuticle layer 12 and surrounding of the sod cells 10. Because the lipid layers (14 and 22) contain waxes, cutin and small amounts of some polysaccharides (cellulose and pectins), the cuticles 14 are hydrophobic, and they help control evaporation and permeability. The cuticle is made up of two (2) layers, the cuticle proper 11, and the cuticular layer 12. The cuticle proper 11 is covered with an epicuticular wax film 16, and epicuticular wax crystals 28 may be scattered on the outside of the cuticle proper 11. Inside the cuticle proper 11 and the cuticular layer 12 is a polysaccharide cell wall 22 made up of polysaccharides 24 and epidermal cells 26. The cutin layer 18 is on the outside of the polysaccharide cell wall 22.

Figure 2:
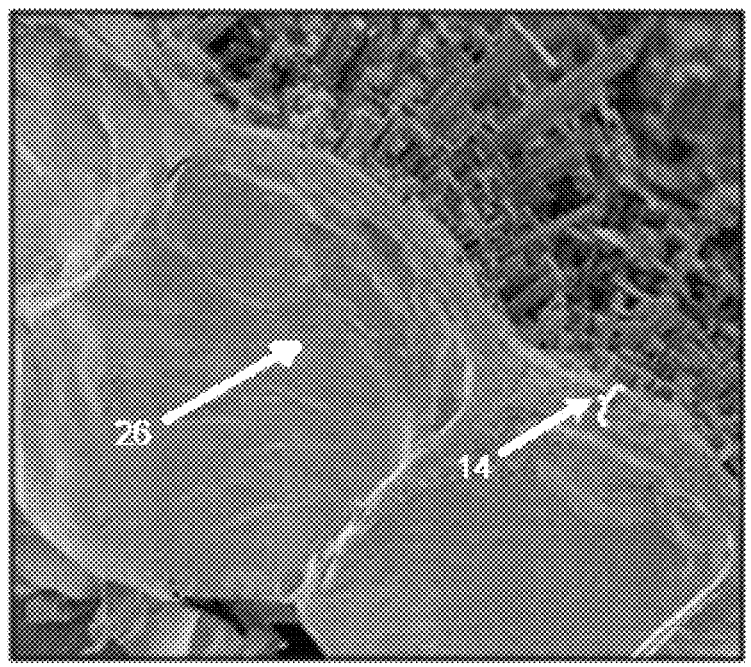
FIG. 2 is a microscopic view of the cuticle layer of sod cells.

FIG. 2 shows a microscopic view of the cuticle layer 14 of the epidermal cells 26 of the sod 100.

Figure 3A:
FIG. 3a is a schematic of the molecular structure of a linear alkane of a mineral oil.
Figure 3B:
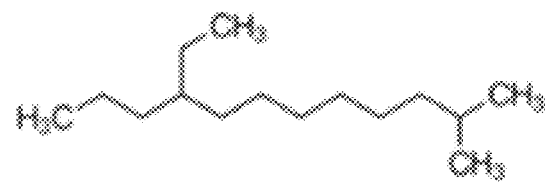
FIG. 3b is a schematic of the molecular structure of a branched alkane of a mineral oil.
Figure 3C:
FIG. 3c is a schematic of the molecular structure of a cyclic-substituted alkane of a mineral oil.

FIGS. 3a, 3b, and 3c illustrate the molecular structures of examples of linear, branched, and cyclic alkanes of the improved mineral oil. FIG. 3a illustrates a C15 (indicates that there are 15 carbon molecules) linear alkane. FIG. 3b illustrates a C15 branched alkane (isoparaffin). FIG. 3c illustrates a C15 cyclic-substituted alkane (napthene). The manufacturing process creates a mineral oil that has a similar molecular structure to the natural Alkane found in the plant cuticle. The improved mineral oil mimics the plants' natural waxes. As used herein, "mineral oil" includes aliphatic solvents, dormant oils, foliage oils, foliar oils, horticultural oils, insecticidal oils, narrow-range oils, neutral oils, paraffinic oils, alkane, petroleum-derived spray oils, petroleum distilled spray oils, PDSOs, petroleum spray oils, PSOs, refined petroleum distillates, spray oils, and summer oils.

The improved mineral oil is originally sourced from paraffinic crude oil, although it is possible to source mineral oil from naphthenic crude oil as well. As used herein, paraffinic crude oil (or feedstocks) has greater than 50% paraffinic content. Vacuum gas oils (VGO) or hydro cracker bottoms (HCB) are derived or processed from the paraffinic. VGO and HCB derived from naphthenic crudes are not suitable for the end-use applications as described herein.

Mineral oils are rated (e.g. Group 1, Group 2 or Group 3) based upon how the feedstocks are processed. The categorization of the mineral oils impacts the chemical abstract number (CAS#) that the mineral oil is assigned. A CAS# is a unique number string that identifies a specific chemical substance. The improved mineral oils may have a CAS# of 8042-47-5. More generally, the improved mineral oil is a white mineral oil and may potentially be used in pharmaceuticals and the like. The improved mineral oil should have minimal aromatics or other elements still residing in the finished mineral oil. In addition, the improved mineral oil has at least a 30% paraffin content, but it may have at least 40% paraffin content, at least 50% paraffin content, or more.

The improved mineral oil may have a hydrocarbon composition/distribution range from C15 to C30. However, it is anticipated that the ideal range to be used on plants to provide both efficacy and plant safety is from C16 to C24. Other mineral oils can have different ranges. Mineral oils that have a composition that include C10 to C14 are more volatile and would not provide the efficacy (fungicidal/insecticidal/etc.) rendering them less useful. For mineral oils that include the range above C24, these products are heavier and would persist on plants longer, which could result in adverse effects on plant (i.e. plant damage/phyto-toxicity, etc.)

FIG. 4 illustrates the molecular structures of examples of molecular structures of natural Alkanes found in the plant cuticle 14. These are major acyl-lipid classes found in cuticular waxes 16. Most of the classes occur as homologous series with broad distributions of chain lengths. Compounds with typical average chain lengths are shown. The cuticle 14 of a plant 100 is a solid paraffin wax.

Figure 5A:
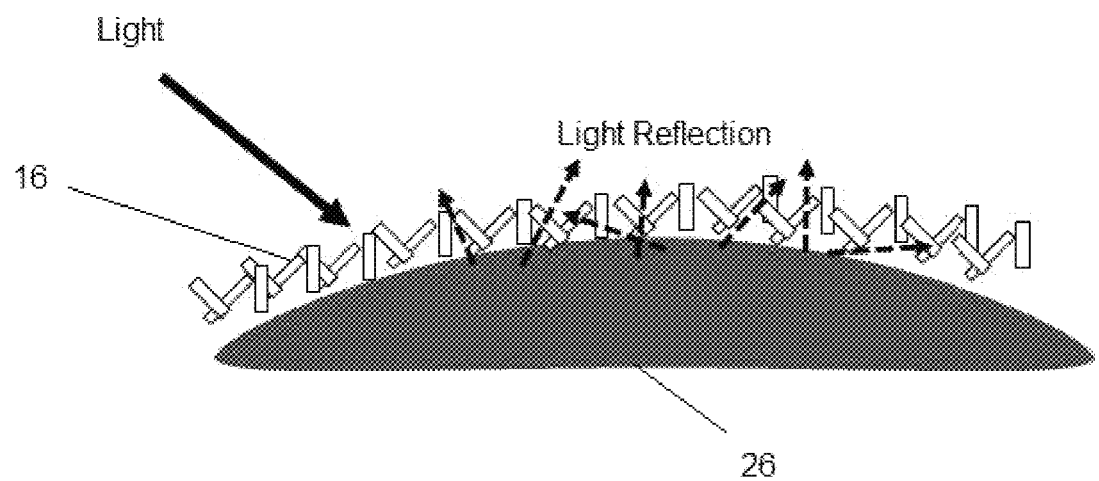
FIGS. 5a and 5b are diagrams illustrating the effects of the application of the improved mineral oil on the surface of the sod plants.
Figure 5B:
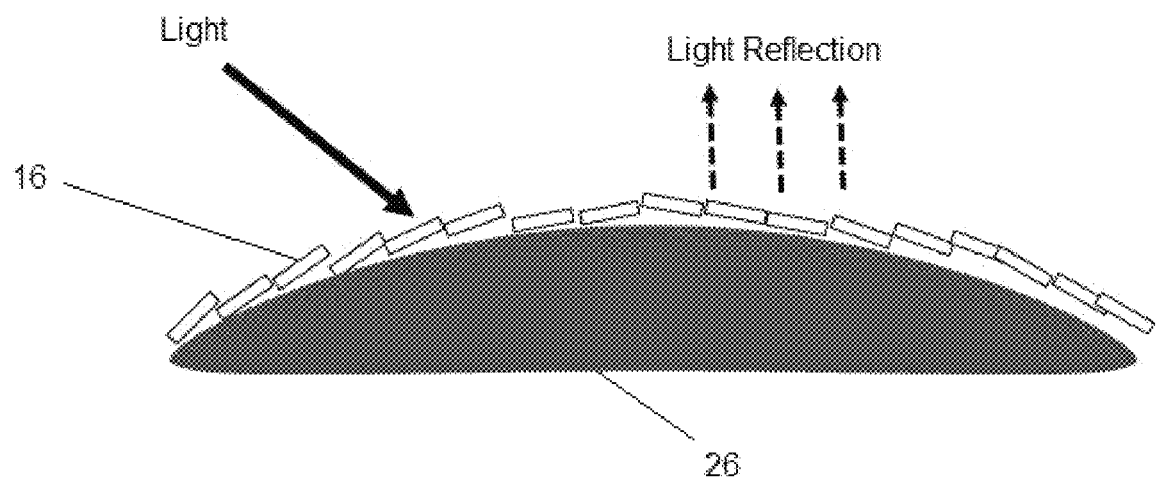

FIGS. 5a and 5b illustrates some of the effects the application of the improved mineral oil, as used in the method of the current invention, has on the surface of the sod plants 100. The morphology of the epidermal cell's 26 wax cuticles 16 is changed, but it is not removed. The improved mineral oil causes the wax platelets 14 of the cuticle 12 to lie more flat than they do naturally. This often manifests in a change in the appearance of the plant 100. Prior to application, the plant 100 may have a waxy, hazy look, while after application it 100 tends to be more shiny. This occurs because once the wax platelets 16 of the cuticle 12 lie more flat, light reflects more directly and uniformly away from the plant 100 surface, as opposed to the reflection being scattered in a plethora of directions, scattering it when the wax platelets 16 stand naturally.

Figure 6:
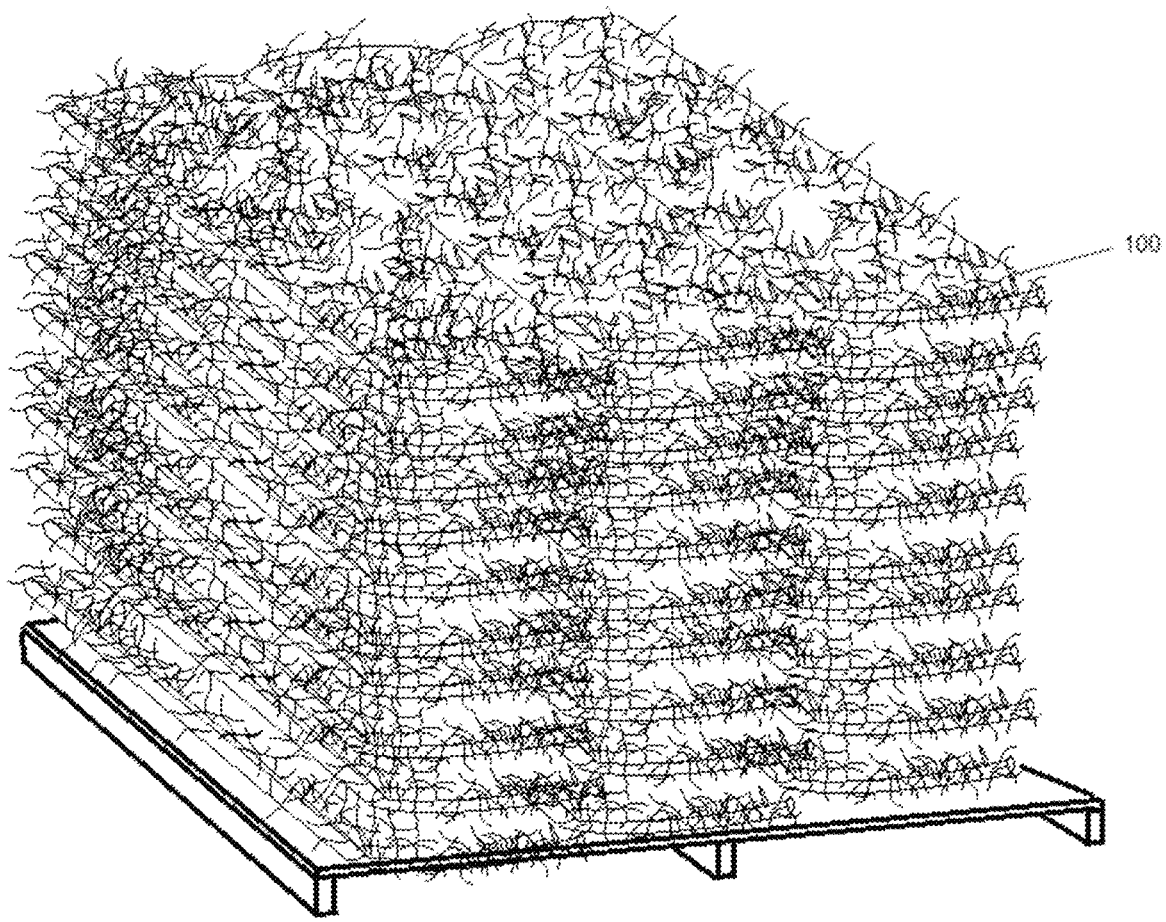
FIG. 6 is a perspective view of stacked sod.
Figure 7:
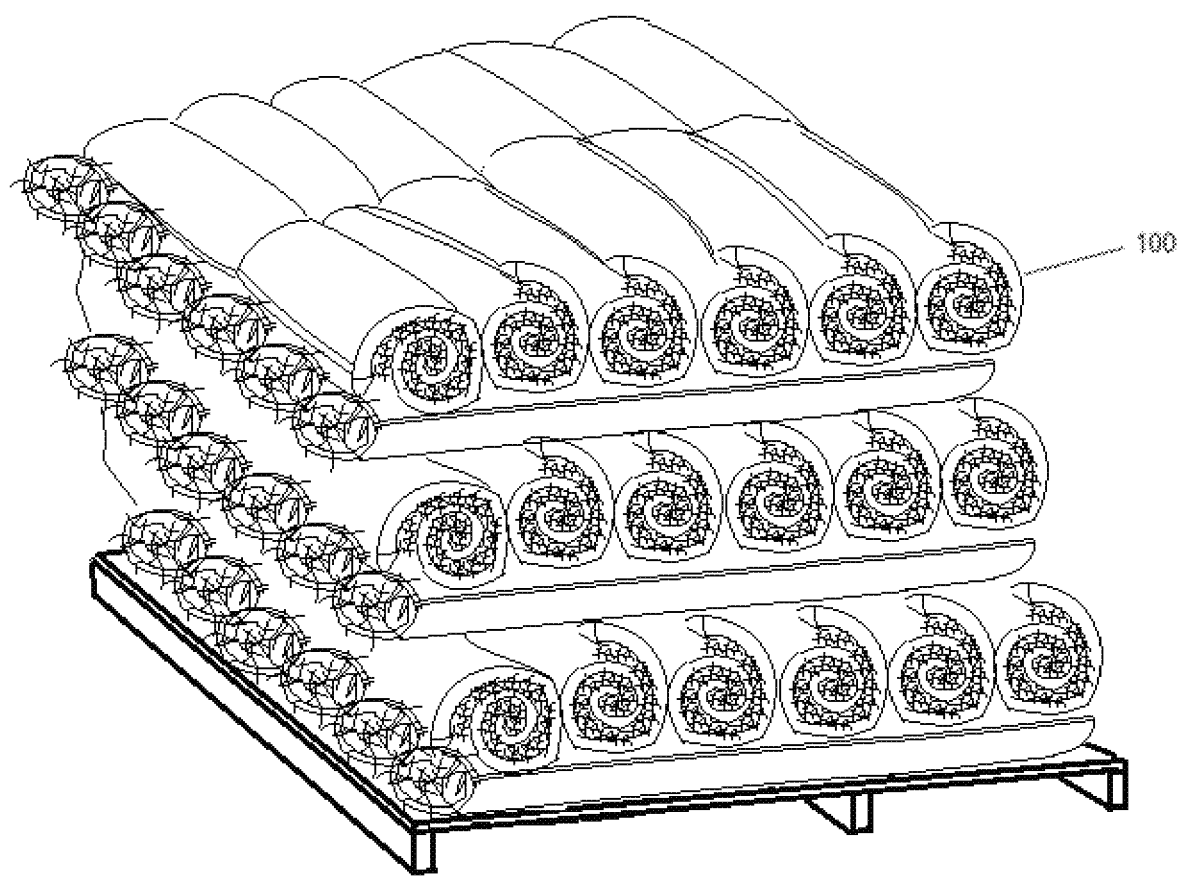
FIG. 7 is a perspective view of rolled and stacked sod.

FIG. 6 illustrates an example of how cut sod 100 can be stacked, while FIG. 7 illustrates an example of how cut sod 100 can be rolled and stacked. In either case, the grass plants 100 are exposed to a number of physical stresses such as reduced light, weight on the grass plants 100, and increased temperature all due to the sod 100 pieces being laid on top of one-another. There is also a reduction in water because sod grass 100 in the covered layers do not get any water that is applied.

Figure 8:
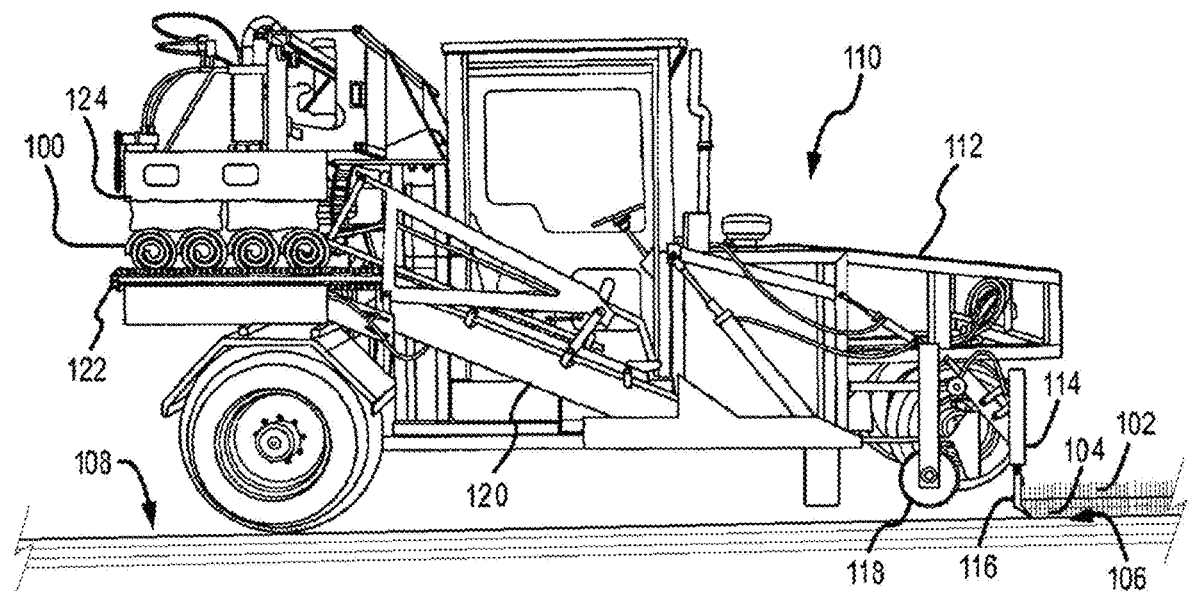
FIG. 8 illustrates a sod harvester.

FIG. 8 illustrates a sod harvester 110 as disclosed in U.S. Pat. No. 7,740,083. As used herein, this illustration is intended to convey an embodiment of a generic sod harvester 110. A sod harvester 110 is a machine that is designed to remove strips of sod 100 from a field or lawn 108 with the most of the roots 104 and surrounding soil 106 attached. The sod harvester 110 includes a vehicle 112 to which the harvesting mechanisms are attached. The vehicle 112 may be self-propelled, pulled or pushed. The vehicle 112 helps move the sod harvester 110 across the field 108. Carried by the machine is a cutting assembly 114 that has sharp blades 116 that cut through the soil 106 beneath the grass 102 so a strip of sod 100 can be lifted away after each cut. Sod harvesters 110 usually have a roller 118 engaged near the base of the cutting assembly 114 that helps to move the cutting assembly 114 over and just above the field 108. The blades 116 are typically adjustable, so that sod 100 can be cut in varying widths and thicknesses. The harvesting mechanisms include a cutting assembly 114 that cuts the sod plants 100, near the bottom of the roots 104. The cut may be above or below the bottom tips of the roots 104. The cutting (or harvesting) of sod 100 is a causes major mechanical and root 104 pruning stress that the grass plant 102 faces. When the sod 100 strips are cut, they may travel up a conveyor assembly 120 to a conveyor belt 122 and rolling mechanism 124. In an alternative embodiment, instead of a rolling mechanism 124, the sod 100 strips may be stacked by a stacking mechanism (not shown).

An aspect of the method of the present invention may involve applying a combination of improved mineral oil and copper pigment to sod prior to cutting and stacking. The copper pigment has a synergistic effect with the mineral oil that increases efficacy and better protects the sod. The copper that is in the pigment is not a free copper atom—it is connected/in union with the chelated pigment/color. Chelation is a type of bonding of ions and molecules to metal ions. Without the union between the organic copper atoms and the pigment, the efficacy/impact of the overall pigment does not materialize. As an application vehicle for the improved mineral oil and copper pigment combination, it is anticipated that water with an emulsifier will be used. The emulsifier allows the improved mineral oil and water to mix in the applicator's spray tank. The emulsifier may be an ethooxylated alcohol emulsifier. When the combination is applied to sod just prior to the sod being cut and stacked, it will increase resistance of the sod to the stresses associated with sod harvesting and replanting resulting in extended sod shelf life and allow for higher percentage of successful replanting of turf. In addition, by applying a combination of paraffinic oil, emulsifier, copper pigment and water to sod will allow sod to extend the growing season by delaying dormancy allowing for an accelerated harvest.

The method of the present invention involves the application of the improved mineral oil to a plot of sod prior to harvesting. For the best results, the improved mineral oil should be absorbed by the plant. Generally, the longer the sod plants are exposed to the improved mineral oil, the better the absorption of the improved mineral oil by the sod plants. This is generally accomplished by applying two (2) or more applications of the improved mineral oil. In one embodiment of the invention, a first application may occur approximately twenty-eight (28) days to fourteen (14) days immediately before harvesting, while a second application may occur approximately thirteen (13) to three (3) days prior to harvesting. It is anticipated that additional applications of the improved mineral oil to the sod may be made both within the twenty-eight (28) day time period immediately before harvesting, or prior to the twenty-eight (28) day time period immediately before harvesting. The sod will be harvested, or cut, using a sod cutter into transport sized pieces. When stacked or rolled, the sod may be turned or placed with the canopy side down or covered. It is anticipated that the sod, while stored after cutting, during transportation, and otherwise prior to installation, may be stored in full sun with no supplemental water applied. After sod is planted, it is anticipated that the sod will be managed according to best management practices. It is anticipated that the applications of the improved mineral oil may be approximately 1.5 to 3.5 gallons/acre of sod, or about 4.38 to 10.22 fl. oz./1000 ft$^2$ of sod. In a preferred embodiment, the applications are approximately 2.5 gallons/acre of sod, or about 7.3 fl. oz./1000 ft$^2$ of sod.

The method of the present invention allows for improved re-establishment of the sod once it has been laid/planted, in part because the reduction of transpiration specifically reduces the need for water. When sod is cut, and during re-establishment, the sod is subject to water stress due to a root system that has been severed to some degree. The use of improved mineral oil and causing a reduction of water use 20-50% benefits turf grass during this period of re-establishment and a compromised root system.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

Unless otherwise specifically noted, the articles depicted in the drawings are not necessarily drawn to scale, but they are illustrative, and to persons with knowledge in the art the drawings will indicate relative size, angles, shapes, placement, and like information regarding the elements and articles in the drawing.

When the terms "substantially," "approximately," "about," or "generally" are used herein to modify a numeric value, range of numeric values, or list numeric values, the term modifies each of the numerals. Unless otherwise indicated, all numbers expressing quantities, units, percentages, and the like used in the present specification and associated claims are to be understood as being modified in all instances by the terms "approximately," "about," and "generally." As used herein, the term "approximately" encompasses +/−5 of each numerical value. For example, if the numerical value is "approximately 80," then it can be 80 +/−5, equivalent to 75 to 85. As used herein, the term "about" encompasses +/−10 of each numerical value. For example, if the numerical value is "about 80," then it can be 80 +/−10, equivalent to 70 to 90. As used herein, the term "generally" encompasses +/−15 of each numerical value.

For example, if the numerical value is "about 80," then it can be 80% +/−15, equivalent to 65 to 95. Accordingly, unless indicated to the contrary, the numerical parameters (regardless of the units) set forth in the following specification and attached claims are approximations that may vary depending upon the desired properties sought to be obtained by the exemplary embodiments described herein. In some ranges, it is possible that some of the lower limits (as modified) may be greater than some of the upper limits (as modified), but one skilled in the art will recognize that the selected subset will require the selection of an upper limit in excess of the selected lower limit.

At the very least, and not limiting the application of the doctrine of equivalents to the scope of the claim, each numerical parameter should at least be construed in light of the number of reported significant digits and by applying ordinary rounding techniques.

The terms "inhibiting" or "reducing" or any variation of these terms refer to any measurable decrease, or complete inhibition, of a desired result. The terms "promote" or "increase" or any variation of these terms includes any measurable increase, or completion, of a desired result.

The term "effective," as that term is used in the specification and/or claims, means adequate to accomplish a desired, expected, or intended result.

The terms "a" or "an" when used in conjunction with the term "comprising" in the claims and/or the specification may mean "one," but it is also consistent with the meaning of "one or more," "at least one," and "one or more than one."

The term "each" refers to each member of a set, or each member of a subset of a set.

The terms "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

In interpreting the claims appended hereto, it is not intended that any of the appended claims or claim elements invoke 35 U.S.C. 112(f) unless the words "means for" or "step for" are explicitly used in the particular claim.

It should be understood that, although exemplary embodiments are illustrated in the figures and description, the principles of the present disclosure may be implemented using any number of techniques, whether currently known or not. The present disclosure should in no way be limited to the exemplary implementations and techniques illustrated in the drawings and description herein. Thus, although the invention has been described with reference to specific embodiments, this description is not meant to be construed in a limited sense. Various embodiments may include some, none, or all of the enumerated advantages. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention. Modifications, additions, or omissions may be made to the systems, apparatuses, and methods described herein without departing from the scope of the disclosure. For example, the operations of the systems and apparatuses disclosed herein may be performed by more, fewer, or other components in the methods described may include more, fewer, or other steps. Additionally, steps may be performed in any suitable order.

What is claimed:

1. A method for treating sod during harvesting, transport, and replanting, comprising:
    applying a first application of an improved mineral oil to a plot of sod in the range of approximately thirteen (13) to three (3) days prior to harvesting said sod;
    wherein said improved mineral oil contains 5% or less of aromatic molecules; and
    wherein said improved mineral oil is applied in a range of approximately 1.5 to 3.5 gallons/acre of sod, or about 4.38 to 10.22 fl oz/1000 ft$^2$ of sod.

2. The method of claim 1, wherein said improved mineral oil contains carbon chain lengths that range from approximately C15-C32.

3. The method of claim 1, wherein said improved mineral oil contains greater than 80% carbon by weight.

4. The method of claim 2, wherein said improved mineral oil contains greater than 80% carbon by weight.

5. The method of claim 4, wherein said improved mineral oil is applied in the amount of approximately 2.5 gallons/acre of said sod.

6. The method of claim 1, wherein said improved mineral oil is selected from one of: aliphatic solvents, dormant oils, foliage oils, foliar oils, horticultural oils, insecticidal oils, narrow-range oils, neutral oils, paraffinic oils, alkane, petroleum-derived spray oils, petroleum distilled spray oils, PDSOs, petroleum spray oils, PSOs, refined petroleum distillates, spray oils, and summer oils.

7. The method of claim 4, wherein said improved mineral oil is selected from one of: aliphatic solvents, dormant oils, foliage oils, foliar oils, horticultural oils, insecticidal oils, narrow-range oils, neutral oils, paraffinic oils, alkane, petroleum-derived spray oils, petroleum distilled spray oils, PDSOs, petroleum spray oils, PSOs, refined petroleum distillates, spray oils, and summer oils.

8. The method of claim 1, wherein said improved mineral oil is originally sourced from a paraffinic crude oil, said paraffinic crude oil having at least a 30% paraffin content.

9. The method of claim 4, wherein said improved mineral oil is originally sourced from a paraffinic crude oil, said paraffinic crude oil having at least a 30% paraffin content.

10. The method of claim 7, wherein said improved mineral oil is originally sourced from a paraffinic crude oil, said paraffinic crude oil having at least a 30% paraffin content.

11. The method of claim 1, wherein said improved mineral oil is originally sourced from a paraffinic crude oil, said paraffinic crude oil having at least 50% paraffin content.

12. The method of claim 4, wherein said improved mineral oil is originally sourced from a paraffinic crude oil, said paraffinic crude oil having at least a 50% paraffin content.

13. The method of claim 7, wherein said improved mineral oil is originally sourced from a paraffinic crude oil, said paraffinic crude oil having at least a 50% paraffin content.

14. The method of claim 1, further comprising applying a second application of said improved mineral oil to said plot of sod in the range of approximately twenty-eight (28) days to fourteen (14) days prior to harvesting said sod.

15. A method for treating sod during harvesting, transport, and replanting, comprising:
    applying a first application of an improved mineral oil to a plot of sod in the range of approximately thirteen (13) to three (3) days prior to harvesting said sod;
    wherein said improved mineral oil contains 5% or less of aromatic molecules;

wherein said improved mineral oil has a hydrocarbon composition/distribution range from C15 to C32; and
wherein said improved mineral oil is applied in a range of approximately 1.5 to 3.5 gallons/acre of sod, or about 4.38 to 10.22 fl oz/1000 ft$^2$ of sod.

16. The method of claim 15, wherein said improved mineral oil has a hydrocarbon composition/distribution range from C16 to C24.

17. The method of claim 15, wherein said improved mineral oil contains 1% or less of aromatic molecules.

18. The method of claim 15, wherein said improved mineral oil contains greater than 80% carbon by weight.

19. The method of claim 17, wherein said improved mineral oil contains greater than 80% carbon by weight.

20. The method of claim 15, wherein said improved mineral oil is selected from one of: aliphatic solvents, dormant oils, foliage oils, foliar oils, horticultural oils, insecticidal oils, narrow-range oils, neutral oils, paraffinic oils, alkane, petroleum-derived spray oils, petroleum distilled spray oils, PDSOs, petroleum spray oils, PSOs, refined petroleum distillates, spray oils, and summer oils.

21. The method of claim 19, wherein said improved mineral oil is selected from one of: aliphatic solvents, dormant oils, foliage oils, foliar oils, horticultural oils, insecticidal oils, narrow-range oils, neutral oils, paraffinic oils, alkane, petroleum-derived spray oils, petroleum distilled spray oils, PDSOs, petroleum spray oils, PSOs, refined petroleum distillates, spray oils, and summer oils.

22. The method of claim 20, wherein said improved mineral oil is applied in the amount of approximately 2.5 gallons/acre of said sod.

23. The method of claim 15, wherein said improved mineral oil is originally sourced from a paraffinic crude oil, said paraffinic crude oil having at least a 30% paraffin content.

24. The method of claim 19, wherein said improved mineral oil is originally sourced from a paraffinic crude oil, said paraffinic crude oil having at least a 30% paraffin content.

25. The method of claim 21, wherein said improved mineral oil is originally sourced from a paraffinic crude oil, said paraffinic crude oil having at least a 30% paraffin content.

26. The method of claim 15, wherein said improved mineral oil is originally sourced from a paraffinic crude oil, said paraffinic crude oil having at least 50% paraffin content.

27. The method of claim 17, wherein said improved mineral oil is originally sourced from a paraffinic crude oil, said paraffinic crude oil having at least a 50% paraffin content.

28. The method of claim 19, wherein said improved mineral oil is originally sourced from a paraffinic crude oil, said paraffinic crude oil having at least a 50% paraffin content.

29. The method of claim 15, further comprising applying a second application of said improved mineral oil to said plot of sod in the range of approximately twenty-eight (28) to fourteen (14) days prior to harvesting said sod.

30. A method for treating sod during harvesting, transport, and replanting, comprising:
applying a first application of an improved mineral oil to a plot of sod in the range of approximately thirteen (13) to three (3) days prior to harvesting said sod;
applying a second application of said improved mineral oil to said plot of sod in the range of approximately twenty-eight (28) days to fourteen (14) days prior to harvesting said sod;
wherein said improved mineral oil contains 5% or less of aromatic molecules;
wherein said improved mineral oil is applied in a range of approximately 1.5 to 3.5 gallons/acre of sod, or about 4.38 to 10.22 fl oz/1000 ft$^2$ of sod; and
wherein said improved mineral oil contains carbon chain lengths that range from approximately C15-C32.

31. The method of claim 30, wherein said improved mineral oil contains 1% or less of aromatic molecules.

32. The method of claim 31, wherein said improved mineral oil contains a hydrocarbon composition/distribution range from C16 to C24.

33. The method of claim 32, wherein said improved mineral oil is applied in the amount of approximately 2.5 gallons/acre of said sod.

34. A method for treating sod during harvesting, transport, and replanting, comprising:
applying a first application of a combination of an improved mineral oil and a copper pigment to a plot of sod in the range of approximately thirteen (13) to three (3) days prior to harvesting said sod;
applying a second application of said combination of improved mineral oil and copper pigment to said plot of sod in the range of approximately twenty-eight (28) days to fourteen (14) days prior to harvesting said sod.

35. The method of claim 34:
wherein said improved mineral oil contains 5% or less of aromatic molecules;
wherein said improved mineral oil is applied in a range of approximately 1.5 to 3.5 gallons/acre of sod, or about 4.38 to 10.22 fl oz/1000 ft$^2$ of sod; and
wherein said improved mineral oil contains carbon chain lengths that range from approximately C15-C32.

36. The method of claim 35, wherein said combination of an improved mineral oil and a copper pigment also includes water and an emulsifier.

37. The method of claim 35, further comprising applying a third application of said combination of improved mineral oil and copper pigment to said plot of sod in the range of approximately fifty-six (56) days to twenty-eight (28) days prior to harvesting said sod.

38. The method of claim 35, wherein said improved mineral oil is applied in the amount of approximately 2.5 gallons/acre of said sod.

39. A method for treating sod during harvesting, transport, and replanting, comprising:
applying an improved mineral oil to a plot of pre-harvested sod;
wherein said applying step is done using an amount of said improved mineral oil and with enough time before harvesting that said improved mineral oil is generally absorbed by said sod;
wherein said improved mineral oil contains 5% or less of aromatic molecules; and
wherein said improved mineral oil contains carbon chain lengths that range from approximately C15-C32.

* * * * *